No. 846,305. PATENTED MAR. 5, 1907.
W. A. & B. S. H. HARRIS.
COMBINED TRAIN SIGNAL AND INDICATING APPARATUS.
APPLICATION FILED MAR. 23, 1904. RENEWED JUNE 6, 1906.
3 SHEETS—SHEET 2.
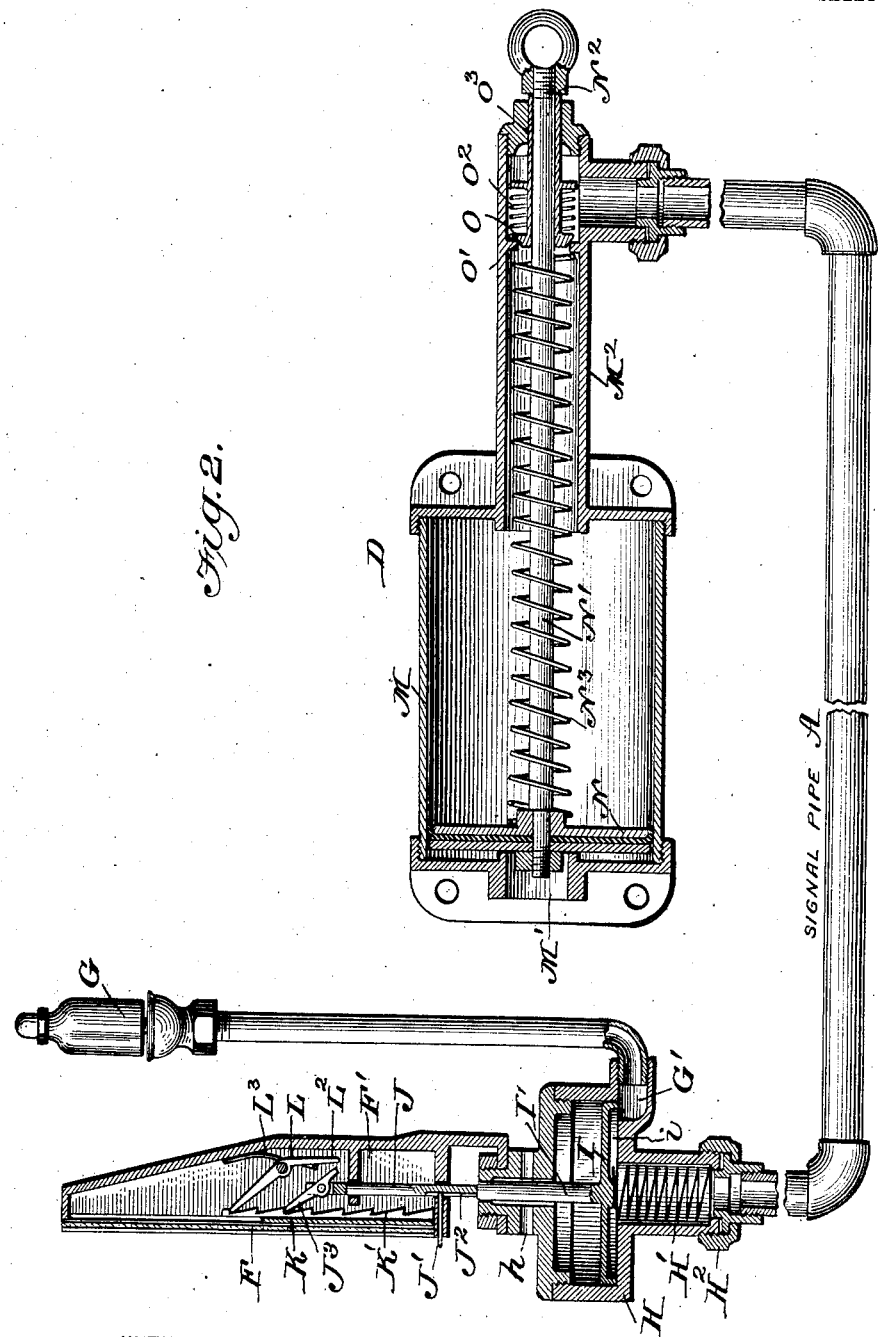
WITNESSES:
Jos. A. Ryan
Perry B. Turpin
INVENTORS
William A. Harris
Benjamin S. H. Harris
BY Munn & Co.
ATTORNEYS No. 846,305.  
PATENTED MAR. 5, 1907.
W. A. & B. S. H. HARRIS.  
COMBINED TRAIN SIGNAL AND INDICATING APPARATUS.  
APPLICATION FILED MAR. 23, 1904. RENEWED JUNE 6, 1906.
3 SHEETS—SHEET 3.
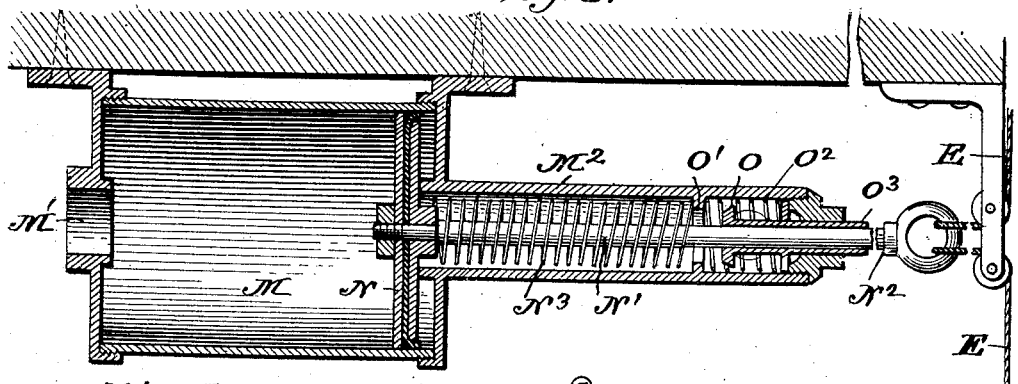
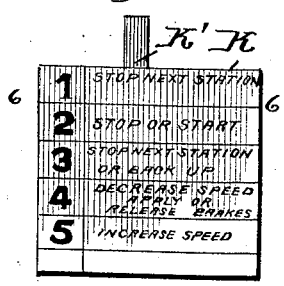
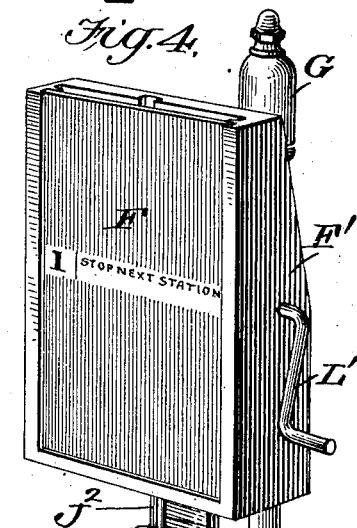
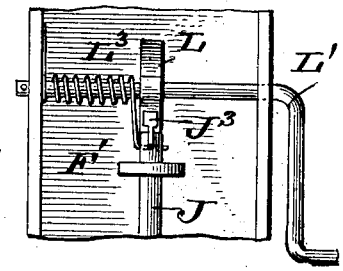
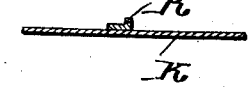
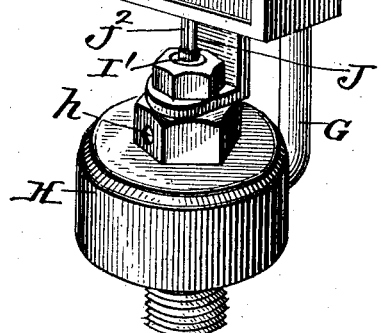
WITNESSES:  
Jos. A. Ryan  
Perry B. Turpin
INVENTORS  
William A. Harris.  
Benjamin S. H. Harris.  
BY Munn & Co.  
ATTORNEYS

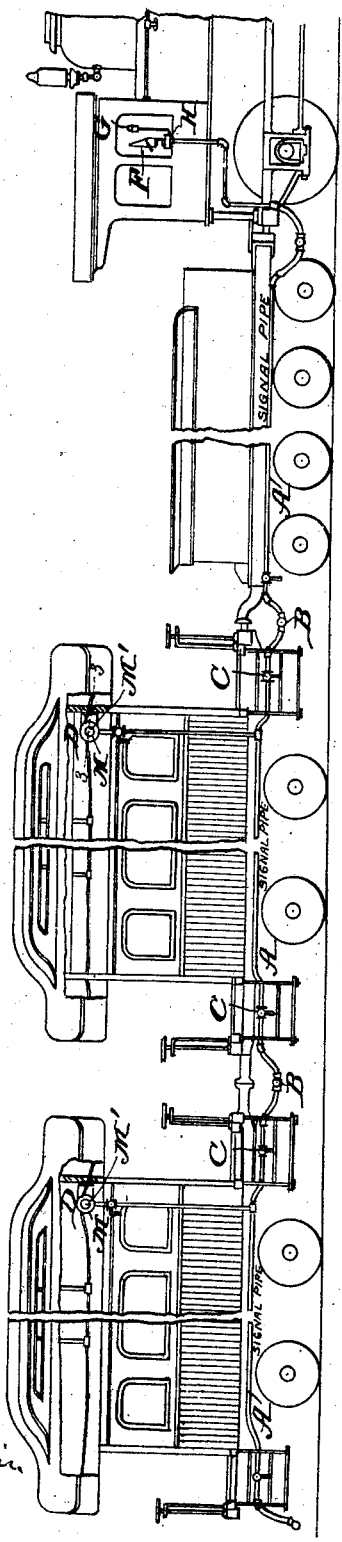

UNITED STATES PATENT OFFICE.

WILLIAM ANDREW HARRIS AND BENJAMIN SAMUEL HAMPTON HARRIS, OF GREENVILLE, SOUTH CAROLINA, ASSIGNORS TO THE HARRIS MANUFACTURING COMPANY, OF GREENVILLE, SOUTH CAROLINA, A CORPORATION OF SOUTH CAROLINA.

COMBINED TRAIN SIGNAL AND INDICATING APPARATUS.

No. 846,305.     Specification of Letters Patent.     Patented March 5, 1907.

Application filed March 23, 1904. Renewed June 6, 1906. Serial No. 320,450.

*To all whom it may concern:*

Be it known that we, WILLIAM ANDREW HARRIS and BENJAMIN SAMUEL HAMPTON HARRIS, citizens of the United States, residing at Greenville, in the county of Greenville and State of South Carolina, have made certain new and useful Improvements in a Combined Train Signal and Indicating Apparatus, of which the following is a specification.

This invention is an improvement in signaling and indicating apparatus for use on railway-trains, being especially designed for use on passenger-trains and adapted through the aid of an independent train-pipe to communicate an audible and a visual signal to the engineer, the visual signal corresponding to the audible signal and remaining in position to indicate the audible signal which has been given until the indicating devices have been released by the engineman; and the invention consists in certain novel constructions and combinations of parts, as will be hereinafter described and claimed.

In the drawings, Figure 1 is a diagrammatic side elevation, partly broken away, of a train of cars provided with our improvements. Fig. 2 is a sectional elevation of the signal devices and the operating device for creating impulses in the signal-pipe. Fig. 3 is a detail horizontal section of the operating device on about line 3 3 of Fig. 1. Fig. 4 is a detail perspective view of the signal. Fig. 5 is a detail face view of the indicator-plate. Fig. 6 is a cross-section of such plate on about line 6 6 of Fig. 5; and Fig. 7 is a face elevation of the interior of the indicator, parts being removed and others shown in section.

By our invention we provide for use in connection with the signal-pipe A, extending throughout the train and suitably coupled at B between the cars and having valves at C, as best shown in Fig. 1, an operating device (shown in Figs. 2 and 3) whereby the air in the signal-pipe may be compressed or caused to move and a signal in the locomotive arranged to be operated by the air in the signal-pipe as the latter is operated by the operating device shown in Figs. 2 and 3. In the use of our invention we provide an operating device D in each car and suitably connected with the signal-pipe, as will be described, and preferably arranged for operation by the bell-rope E, as best shown in Fig. 3, and we arrange the signal device in the locomotive-cab so it will be operated when the device D is operated by the conductor or other trainman. The signal device shown includes a visual indicator F and a whistle G. The whistle G communicates at G' with the lower end of a cylinder H, having a depending tubular portion or nipple H' connected by a coupling H² with the signal-pipe A, as best shown in Fig. 2. The upper end of the cylinder H is ported at $h$, and a piston I operates in the cylinder H and is chambered on its under side at $i$, so that when the piston is in its lowest position, as shown in Fig. 2, it will not shut off the passage of air from the signal-pipe to the whistle G. The piston I has an upwardly-projecting piston-rod I', suitably guided and arranged to operate against the lower end of a slide-rod J, which is movable longitudinally in the indicator-case F' and held from turning by a pin J', operating in a groove J² in the slide-rod J, and said rod is provided with a pallet J³, which engages a ratchet K' on the indicator-plate K, so that the said plate K will be given a step-by-step movement as the slide-rod J is moved successively by the operations of the piston I, the latter being operated by the impulses given to the air in the signal-pipe by means of the operating devices presently described. A detent-pawl L also engages the ratchet K' and holds the same in the positions to which it may be moved by its pallet J² until the operator, by means of the crank-handle L', connected with said detent-pawl L, releases the pawl and the latter releases the pallet J³, so that the indicator-plate can be readjusted by gravity to its initial position as shown in Fig. 2. The weight of the crank-arm L' and of the lower end L² of the pawl L ordinarily operates to hold the point of the pawl L in engagement with the ratchet K'; but to aid in such operation, and especially to render the same more certain, we may employ a spring L³, as will be understood from Figs. 2 and 7 of the drawings.

The indicator-plate K has a series of inscriptions, as best shown in Fig. 5, denoting the signals intended to be transmitted by one, two, three, or more blasts of the whistle G, the signal corresponding to the number 1 being the upper one on the indicator-plate and the said signals progressing downwardly, as will be understood from Fig. 5. Thus in operation if a single impulse be given the air in the train-pipe A by the operating device the whistle G will sound once and the piston H will be given an upward movement and will operate the slide-rod J to move the indicator-plate one step upward, the detent holding the plate in such position and the slide-rod dropping for a second operation. If a second or third impulse be given the air in the signal-pipe, the whistle will be sounded and the piston-rod operated to correspond and the indicator will be moved in correspondence with the number of signals sounded by the whistle, so that if the engineer should be so busy or otherwise engaged as to fail to notice the exact number of times that the whistle is sounded or if he is in any doubt whatever as to the number of times the whistle has sounded he has only to glance at the indicator to make sure that he has properly understood the signal, and after noting the signal he can at once readjust the indicator for the reception of other signals.

The operating device, as best shown in Figs. 2 and 3, includes a cylinder M open at one end at M' and communicating at its other end by the pipe $M^2$ with the signal-pipe A, together with a piston N, operating in the cylinder, arranged when drawn from the position shown in Fig. 2 to that shown in Fig. 3 to produce an impulse or movement of the air within the signal-pipe in order to operate the whistle and the indicator-operating piston H in the locomotive-cab. It will be noticed that if in operation all of the cylinders M were in communication at all times with the signal-pipe it would be necessary in producing an impulse in the signal-pipe to act upon all the air in the different cylinders, the contents of the cylinders being thus practically added to the contents of the signal-pipe, and to avoid this we provide a check-valve O, controlling communication between each cylinder M and the signal-pipe, and arrange such check-valve O to be held normally closed when the piston N is in the position shown in Fig. 2 and to hold the check-valve closed by the devices which secure the piston N in such position. To this end the check-valve O is seated at O' and closed toward the cylinder M, is actuated toward open position by a spring $O^2$, and has a tubular portion $O^3$ encircling the piston-rod N' and arranged for engagement by a shoulder $N^2$ on the piston-rod N', which shoulder $N^2$, by the action of the spring $N^3$ for readjusting the piston N, operates to hold the check-valve O normally to its seat in the normal position of the piston N, as shown in Fig. 2. By this construction each and every operating device D throughout the train is cut out of connection with the signal-pipe except when said operating device is actuated to produce the desired signaling impulse in the signal-pipe. When this is done and the piston is moved from the position shown in Fig. 2 toward that shown in Fig. 3, the shoulder $N^2$ is released from engagement with the check-valve, the latter will be opened by its spring $O^2$ and offer no resistance to the movement of the air by the piston N out of the cylinder M into the signal-pipe to operate the signal devices as before described. In the specific construction shown in Figs. 2 and 3, the check-valve O operates in the tubular extension $M^2$ of the cylinder M and directly in line with the piston-rod of the piston operating in said cylinder, which construction is preferred because of the direct operation of the check-valve by the piston-rod and the simplicity of the construction employed, as well as by the fact of the piston operating to positively hold the check-valve to its seat when the piston is in normal position or out of action, as shown in Fig. 2.

By our invention it will be noticed it is not necessary to charge the signal-pipe with any pressure, the only pressure therein being the atmospheric pressure and the impulse being given to said atmospheric pressure by the operating device in communication therewith, a check-valve being provided to close communication between the cylinder M and the signal-pipe except when the particular operating device in question is being used for imparting impulse to the air in the train-pipe.

It should be understood that after the impulse has been imparted to the air in the signal-pipe by the movement of the piston to the position shown in Fig. 3 the spring $O^2$ will hold the check-valve open or off its seat until the piston has returned to its normal position, (shown in Fig. 2,) so that in the return movement of the piston the cylinder of the operating device is open to the signal-pipe, and thereby vented, so that the piston can be returned quickly by its actuating-spring, and when returned to its normal position the piston, through the shoulder on its rod acting on the tubular portion of the check-valve, will close the check-valve and hold the same closed, as before described. It will also be understood that as the check-valve is open during the return movement of the piston the latter will draw the air back from the signal-pipe into the cylinder, so that after the whistle has been sounded the return movement of the piston will suck the air back in the signal-pipe, and thus shut off or stop the sounding of the whistle, so the signals given by the whistle will be sharp and clear and will not taper off by the gradual dying away of the impulses given to the air in the signal-pipe, as would occur except for the refilling of the cylinder directly from the signal-pipe.

The construction is simple, can be cheaply applied to trains, and will be found efficient for the purpose described.

Having thus described our invention, what we claim as new, and desire to secure by Letters Patent, is—

1. The combination substantially as herein described, of a signal-pipe, an operating device having a cylinder provided with a tubular extension in connection with the signal-pipe, a piston operating in said cylinder, a check-valve controlling the connection between the cylinder and the signal-pipe and arranged and operating in the tubular extension of the cylinder and having a projecting portion for engagement by the piston-rod, the spring for readjusting the piston to normal position, and the piston-rod extending through the check-valve and having a shoulder or projection arranged to hold the check-valve closed in the normal position of the piston, a cylinder in communication with the signal-pipe and having a port and a whistle connected therewith, a piston operating in said cylinder and chambered on its under side whereby it will not in any position shut off communication between the cylinder and the whistle-port, an indicator above the piston and having a casing, an indicator-plate provided with a ratchet, a slide-rod arranged for operation by the piston and having a pawl engaging with the ratchet of the indicator-plate, a detent for engaging said ratchet to hold the indicator-plate in its different positions, and a crank-arm in connection with said detent for releasing the same, all substantially as and for the purposes set forth.

2. The combination of the signal-pipe, the signal, an operating-cylinder communicating with the signal-pipe, a piston in said cylinder, a check-valve controlling communication between the cylinder and signal-pipe, means whereby the piston when in normal position may hold the check-valve closed, and means for holding the check-valve open when the piston is out of normal position.

3. An apparatus substantially as described, comprising a signal-pipe, a signal arranged to be operated by impulses given the air in said pipe, an operating-cylinder communicating with the signal-pipe, a piston in said cylinder, a check-valve controlling communication between the cylinder and signal-pipe, means whereby the piston when in normal position may hold the check-valve closed, and a spring for holding the check-valve open when the piston is out of normal position.

4. The combination with the signal-pipe, and a signal for operation therefrom, of an operating device having a cylinder connected with the signal-pipe, a pressure-producing piston operating in the cylinder, a spring for holding said piston in normal position, a check-valve between the cylinder and the signal-pipe, and means whereby the piston when in normal position will hold the check-valve closed.

5. The combination of a signal-pipe, the operating device having a cylinder provided with a tubular extension connected with the signal-pipe and having a valve-seat in said tubular extension, the piston in the cylinder, the piston-rod extending through the tubular extension, the check-valve in the tubular extension and encircling the piston-rod, means on the piston-rod for holding the check-valve closed in the normal position of the piston, and a spring for actuating the piston to normal position.

6. In an apparatus substantially as described, the combination of a signal-pipe, a cylinder in communication with said pipe and having a whistle-port, a whistle in communication with said port, a piston operating in said cylinder, the passage to the whistle-port being unobstructed in all positions of the piston, an indicator having a movable part, and means whereby said movable part of the indicator may be operated from the piston.

7. In an apparatus substantially as described and in combination with a pipe for conveying impulses, a series of operating devices comprising cylinders, pistons operating in the cylinders to produce signal-operating pressure in the pipe, and check-valves for controlling communication between the cylinders and the pipe for conveying impulses, and a spring for normally opening the check-valve.

8. In an apparatus substantially as described and in combination with a pipe for conveying impulses, a series of operating devices including cylinders in communication with the pipe, pistons operating in the cylinders to produce signal-operating pressure in the pipe, check-valves controlling the communication between the cylinders and the pipe, and means connected with the pistons whereby to hold the check-valves closed when the pistons are in normal position.

WILLIAM ANDREW HARRIS.
BENJAMIN SAMUEL HAMPTON HARRIS.

Witnesses:
W. E. EARLE, Jr.,
E. M. BLYTHE.